UNITED STATES PATENT OFFICE.

ERNST UTESCHER, OF HAMBURG, GERMANY, ASSIGNOR TO GARANTOL-GESELLSCHAFT M. B. H., A FIRM, OF DRESDEN, GERMANY.

EGG-PRESERVATIVE AND METHOD OF MAKING SAME.

No. 850,693. Specification of Letters Patent. Patented April 16, 1907.

Application filed June 8, 1904. Serial No. 211,690.

*To all whom it may concern:*

Be it known that I, ERNST UTESCHER, a subject of the King of Prussia, residing in Hamburg, Germany, have invented certain new and useful Improvements in an Egg-Preservative and Method of Making Same, of which the following is a full, clear, and exact specification.

It is already known that eggs can be preserved by being laid in a solution of slaked lime. It is also known that this solution of slaked lime penetrates into the egg-shells, when eggs remain a long time therein, and that the lime solution finally penetrates into the contents of the shell. The consequence is that the albumen of the preserved egg becomes thinly liquid and cannot be used with advantage for many purposes—for example, the making of pastry—and, further, the yolk acquires a bad flavor.

The present invention is intended to obviate the disadvantages of the present method of preserving eggs and purports to produce a preserving solution which is powerless to act on the egg-shells. This is effected by adding crushed egg-shells or the constituent elements of egg-shells to the slaked-lime solution. The effect of this addition is that a more or less saturated solution of the constituents of the egg-shells is present in the preserving solution together with the slaked lime, that the action of the lime upon the added egg-shells is fully exhausted, and that consequently the shells of the immersed eggs are not affected by the dissolved slaked lime in the same manner as formerly. Thus the slaked lime, which otherwise has good preserving qualities and is in no way objectionable on hygienic ground, is retained as preserving medium, but that the property of the slaked lime which affects the egg-shells is entirely got rid of in the manner described above.

The method of preparing the preserving liquid for covering the eggs is as follows: To a slaked-lime solution containing an excess of slaked lime egg-shells are added in the proportions of one liter of preserving fluid to five grams of egg-shells, which are previously pulverized as finely as possible. By repeated stirring of the egg-shell powder with the solution and allowing the mixture to stand sufficiently long—three to four weeks—liquid is obtained which contains in addition to slaked lime the substances of which egg-shells are composed mostly in a concentrated solution. Into this solution the eggs to be preserved are placed.

It is not absolutely necessary that egg-shells should be added to the slaked-lime solution. The principal constituents of the same may be employed as an addition. In such case the method of preparing the preserving liquid is carried on as follows: To one hundred liters of preserving liquid containing an excess of slaked lime fifty grams of carbonate of lime, fifty grams of carbonate of magnesia, fifty grams of phosphate of magnesia, and fifty grams of phosphate of lime are added. The solution is allowed to stand for some days or preferably a few weeks, during which time it is repeatedly stirred. Then at any time the liquid may be stirred up again, and the fresh eggs may be placed into the liquid. It is not absolutely necessary to keep this slaked-lime solution, with the addition of the calcium and magnesium salts, being the constituents of the egg-shells, in store. The process may also be applied in the following way: By placing the eggs in layers in the slaked-lime solution and adding between the different layers of eggs carbonate of lime, carbonate of magnesium, (or magnesia,) phosphate of lime, and phosphate of magnesium, so that these additions are more readily taken up by the slaked-lime solution up to its saturation than these compounds would be taken from the egg-shells.

It is preferable to provide near the surface of the preserving liquid an excess of the additions, and this is effected by placing on the top layer of eggs a heavier layer of additions. After the introduction of the eggs the same are covered with a paper saturated with wax, &c., to prevent any change in the contents.

The above-described process to preserve eggs has the great advantage that the natural shells inclosing the eggs remain almost completely unchanged in the solution and that the preserving liquid does not penetrate to the contents of the eggs. This result is obtained because the solution has no diffusing effect and nothing passes over into the solution from the shells inclosing the eggs, so that the structure of the egg-shells is not loosened in any way.

Having thus described my invention, what I claim is—

1. Process of manufacturing a preserving liquid for eggs which consists in pouring a slaked-lime solution containing an excess of slaked lime into a receptacle and adding to it pulverized egg-shells in the quantity above stated, then during a period of two weeks stirring up the liquid repeatedly, substantially as described.

2. Process of manufacturing a preserving liquid for eggs which consists in pouring a slaked-lime solution containing an excess of slaked lime into a receptacle, adding to it a composition containing carbonate of lime, carbonate of magnesium, phosphate of lime and phosphate of magnesium in the proportions above stated, then during a period of two weeks, stirring up the liquid repeatedly, substantially as described.

3. As an article of manufacture an egg-preservative composed of a slaked-lime solution containing an excess of slaked lime and an addition of powdered egg-shells substantially in the proportions specified.

4. As an article of manufacture an egg-preservative composed of a slaked-lime solution containing an excess of slaked lime and an addition of a composition containing carbonate of lime, carbonate of magnesium, phosphate of lime, phosphate of magnesium, substantially in the proportions specified.

In testimony whereof I affix my signature.

ERNST UTESCHER.

In presence of—
  E. H. L. MUMMENHOFF,
  J. CHRIST. HAFERMANN.